(12) United States Patent
Gould et al.

(10) Patent No.: US 11,731,909 B2
(45) Date of Patent: Aug. 22, 2023

(54) SOLVENT MANAGEMENT METHODS FOR GEL PRODUCTION

(71) Applicant: Aspen Aerogels, Inc., Northborough, MA (US)

(72) Inventors: George L. Gould, Mendon, MA (US); Kevin A. Schmidt, Hopkinton, MA (US); Christopher L. Marlette, Grafton, MA (US); Shahrooz Zaghi, Washington, DC (US)

( * ) Notice: Subject to any disclaimer, the term of this patent is extended or adjusted under 35 U.S.C. 154(b) by 585 days.

(21) Appl. No.: 16/818,150

(22) Filed: Mar. 13, 2020

(65) Prior Publication Data

US 2020/0247720 A1 Aug. 6, 2020

Related U.S. Application Data

(63) Continuation of application No. 15/262,422, filed on Sep. 12, 2016, now Pat. No. 10,590,043, which is a continuation of application No. 12/685,666, filed on Jan. 11, 2010, now Pat. No. 9,476,123, which is a continuation of application No. 11/421,032, filed on May 30, 2006, now abandoned.

(60) Provisional application No. 60/685,813, filed on May 31, 2005.

(51) Int. Cl.
| | | |
|---|---|---|
| C04B 35/624 | (2006.01) |
| C23C 18/12 | (2006.01) |
| C04B 40/04 | (2006.01) |
| C04B 35/01 | (2006.01) |
| C04B 40/00 | (2006.01) |
| B29C 35/16 | (2006.01) |
| B29C 39/00 | (2006.01) |
| B05D 1/30 | (2006.01) |
| B05D 3/00 | (2006.01) |
| B29K 105/00 | (2006.01) |
| C04B 41/00 | (2006.01) |

(52) U.S. Cl.
CPC .............. *C04B 35/624* (2013.01); *B05D 1/30* (2013.01); *B05D 3/007* (2013.01); *B29C 35/16* (2013.01); *B29C 39/003* (2013.01); *C04B 35/01* (2013.01); *C04B 40/0075* (2013.01); *C04B 40/04* (2013.01); *C23C 18/1208* (2013.01); *C23C 18/1254* (2013.01); *C23C 18/1283* (2013.01); *B29K 2105/0061* (2013.01); *C04B 41/0063* (2013.01)

(58) Field of Classification Search
None
See application file for complete search history.

(56) References Cited

U.S. PATENT DOCUMENTS

| | | |
|---|---|---|
| 2,188,007 A | 1/1940 | Kistler |
| 3,422,187 A | 1/1969 | Junker et al. |
| 3,434,912 A | 3/1969 | Peri |
| 3,793,102 A | 2/1974 | Day |
| 4,363,738 A | 12/1982 | Kummermehr |

(Continued)

FOREIGN PATENT DOCUMENTS

JP 60052311 A2 3/1985

*Primary Examiner* — Benjamin A Schiffman

(74) *Attorney, Agent, or Firm* — Paul A. Smith; Christopher J. Stow

(57) ABSTRACT

Embodiments of the present invention describe a method for manufacture of a gel material comprising the steps of: forming a gel sheet by dispensing a gel precursor mixture; allowing gelation to occur to the gel precursor mixture; and cooling the formed gel with a cooling system to control reaction rate.

26 Claims, 11 Drawing Sheets

(56) References Cited

U.S. PATENT DOCUMENTS

| | | |
|---|---|---|
| 4,447,345 A | 5/1984 | Kummermehr et al. |
| 4,619,908 A | 10/1986 | Cheng et al. |
| 4,664,859 A | 5/1987 | Knoop |
| 4,667,417 A | 5/1987 | Graser et al. |
| 4,717,708 A | 1/1988 | Cheng et al. |
| 4,801,476 A | 1/1989 | Dunsmir et al. |
| 4,919,850 A | 4/1990 | Blum et al. |
| 4,944,483 A | 7/1990 | Nishizawa |
| 5,073,495 A | 12/1991 | Anderson |
| 5,076,980 A | 12/1991 | Nogues et al. |
| 5,089,188 A | 2/1992 | Varaprasad et al. |
| 5,124,101 A | 6/1992 | Hirao et al. |
| 5,236,483 A | 8/1993 | Miyashita et al. |
| 5,273,705 A | 12/1993 | Sakamoto |
| 5,275,796 A | 1/1994 | Tillotson et al. |
| 5,306,555 A | 4/1994 | Ramamurthi et al. |
| 5,565,142 A | 10/1996 | Deshpande et al. |
| 5,759,506 A | 6/1998 | Jansen et al. |
| 5,786,059 A | 7/1998 | Frank et al. |
| 5,789,075 A | 8/1998 | Frank et al. |
| 5,830,387 A | 11/1998 | Yokogawa et al. |
| 5,866,027 A | 2/1999 | Frank et al. |
| 5,938,805 A | 8/1999 | Bail et al. |
| 5,962,539 A | 10/1999 | Perrut et al. |
| 5,972,254 A | 10/1999 | Sander |
| 5,973,015 A | 10/1999 | Coronado et al. |
| 6,037,277 A | 3/2000 | Masakara et al. |
| 6,077,876 A | 4/2000 | Mendenhall et al. |
| 6,068,882 A | 5/2000 | Ryu |
| 6,080,475 A | 6/2000 | Frank et al. |
| 6,083,619 A | 7/2000 | Frank et al. |
| 6,087,407 A | 7/2000 | Coronado et al. |
| 6,114,068 A | 9/2000 | Yamada et al. |
| 6,140,377 A | 10/2000 | Schwertfeger et al. |
| 6,171,647 B1 | 1/2001 | Holman |
| 6,187,250 B1 | 2/2001 | Champagne |
| 6,197,270 B1 | 3/2001 | Sonada et al. |
| 6,479,416 B1 | 11/2002 | Frank et al. |
| 6,620,355 B1 | 9/2003 | Schmidt |
| 6,645,878 B2 | 11/2003 | Smith et al. |
| 6,656,527 B1 | 12/2003 | Gessner et al. |
| 6,670,402 B1 | 12/2003 | Lee et al. |
| 6,770,584 B2 | 8/2004 | Barney et al. |
| 6,884,822 B2 | 4/2005 | Wang et al. |
| 6,887,563 B2 | 5/2005 | Frank et al. |
| 6,989,123 B2 | 1/2006 | Lee et al. |
| 7,078,359 B2 | 7/2006 | Stepanian et al. |
| 6,998,102 B2 | 12/2006 | Coronado |
| 7,399,439 B2 | 7/2008 | Lee et al. |
| 7,504,346 B2 | 3/2009 | Stepanian et al. |
| 7,780,890 B2 | 8/2010 | Lee et al. |
| 8,214,980 B2 | 7/2012 | Bullock et al. |
| 2002/0094426 A1 | 7/2002 | Stepanian et al. |
| 2003/0113356 A1 | 6/2003 | Deckner et al. |
| 2003/0176602 A1 | 9/2003 | Schmidt et al. |
| 2004/0046272 A1 | 3/2004 | Arai et al. |
| 2004/0212892 A1 | 10/2004 | Tsujimoto |
| 2005/0046086 A1 | 3/2005 | Lee et al. |
| 2007/0152363 A1 | 7/2007 | Begag et al. |
| 2012/0097907 A1 | 4/2012 | Bauer et al. |

SOLVENT MANAGEMENT METHODS FOR GEL PRODUCTION

CROSS REFERENCE TO RELATED APPLICATIONS

This application is a continuation of U.S. patent application Ser. No. 15/262,422 filed Sep. 12, 2016; which is a continuation of U.S. patent application Ser. No. 12/685,666 filed Jan. 11, 2010; which is a continuation of U.S. patent application Ser. No. 11/421,032 filed May 30, 2006; which claims the benefit of U.S. Provisional Application 60/685,813 filed on May 31, 2005; which applications are incorporated by reference herein in their entirety.

SUMMARY

Embodiments of the present invention describe methods for manufacture of gel materials further comprising solvent vapor management elements. One embodiment for management of solvents during gel production comprises the steps of: forming a gel sheet by dispensing a gel precursor mixture onto a moving element at a predetermined rate effective to allow gelation to occur to the gel precursor mixture on the moving element; and cooling the formed gel thereby reducing the rate of solvent evaporation therefrom. Gel precursors can be selected from organic, inorganic or hybrid organic-inorganic sources. In embodiments of the present invention metal oxide gel precursors are preferred. Another embodiment further comprises the step of continuously combining said gel precursor mixture with a fibrous structure, such as a lofty batting, to produce fiber-reinforced gels. Gels may be dried to obtain highly insulating products such as aerogels. In some embodiments the formed gel is cooled to below about 20° C. In another embodiment, the gel is cooled to between about 20° C. and about 0° C. Cooling may be achieved via a cooling means positioned adjacent to the formed gel. Examples of cooing means include a structure for containing and/or conveying a cooling medium wherein said medium can comprise a fluid, gas or both.

DESCRIPTION

Figure 1:
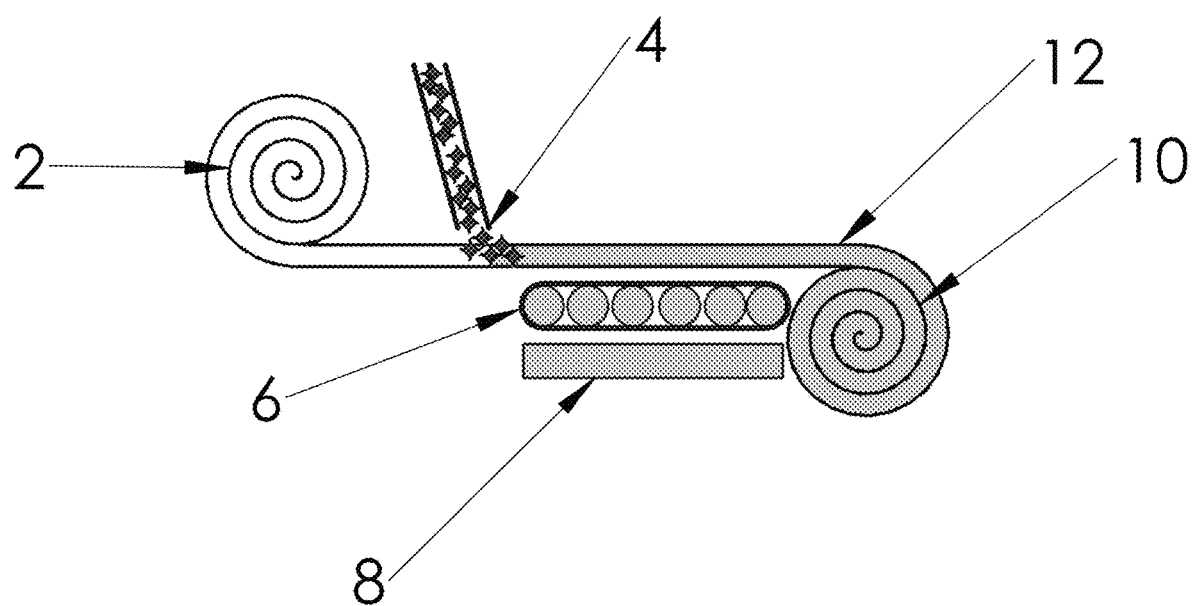
FIG. 1. illustrates an embodiment of the invention where the gel formation occurs relatively early.

One route for preparing gel materials involves the sol-gel process whereby a mobile interstitial solvent phase is entrained within the pores of a solid structure. The solid structure a gel may be derived from inorganic, organic or inorganic/organic hybrid gel precursors which undergo polymerization in a solvent medium and result in a "wet gel", characterized by solvent-filled pores. Wet gels are normally subjected to drying which entails replacing the solvent(s) with air (or a gas) thereby resulting in a number of useful products such as aerogels. In general and without being bound by theory, pore morphology of gels (pore size, volume, distribution, etc.) is understood to vary in direct relation to: method of gelation, solvent-polymer interactions, rate of polymerization and cross-linking, solid content, catalyst content, temperature and a number of other factors. The sol-gel process is described in greater detail in Brinker C. J., and Scherer G. W., *Sol-Gel Science*; New York: Academic Press, 1990; hereby incorporated by reference.

The chemical composition of gel precursors can be inorganic, organic (including polymers) or hybrid organic-inorganic. Inorganic gels may be based on silica, titania, zirconia, alumina, hafnia, yttria, ceria, carbides and nitrides. Organic gels can be based on compounds such as but are not limited to: urethanes, resorcinol formaldehydes, polyimide, polyacrylates, chitosan, polymethylmethacrylate, members of the acrylate family of oligomers, trialkoxysilyl terminated polydimethylsiloxane, polyoxyalkylene, polyurethane, polybutadiane, melamine-formaldehyde, phenol-furfural, a member of the polyether family of materials or combinations thereof. Examples of organic-inorganic hybrid gels include, but are not limited to: silica-PMMA, silica-chitosan, silica-polyether or possibly a combination of the aforementioned organic and inorganic compounds. Published US patent applications 2005/0192367 and 2005/0192366 teach extensively of such hybrid organic-inorganic materials and are hereby incorporated by reference in their entirety.

Drying plays an important role in engineering the properties of aerogels, such as porosity and density which influence the material thermal conductivity. Within the context of the present invention "aerogels" or "aerogel materials" along with their respective singular forms, refer to gels containing air as a dispersion medium in a broad sense, and gels dried with supercritical fluids in a narrow sense. To date, numerous drying methods have been explored. U.S. Pat. No. 6,670,402 teaches drying via rapid solvent exchange of solvent(s) inside wet gels using supercritical $CO_2$ by injecting supercritical, rather than liquid, $CO_2$ into an extractor that has been pre-heated and pre-pressurized to substantially supercritical conditions or above to produce aerogels. U.S. Pat. No. 5,962,539 describes a process for obtaining an aerogel from a polymeric material that is in the form a sol-gel in an organic solvent, by exchanging the organic solvent for a fluid having a critical temperature below a temperature of polymer decomposition, and supercritically drying the fluid/sol-gel. U.S. Pat. No. 6,315,971 discloses processes for producing gel compositions comprising: drying a wet gel comprising gel solids and a drying agent to remove the drying agent under drying conditions sufficient to minimize shrinkage of the gel during drying. Also, U.S. Pat. No. 5,420,168 describes a process whereby Resorcinol/Formaldehyde aerogels can be manufactured using a simple air drying procedure. Finally, U.S. Pat. No. 5,565,142 herein incorporated by reference describes subcritical drying techniques. The embodiments of the present invention can be practiced with drying using any of the above techniques. In some embodiments, it is preferred that the drying is performed at vacuum to below super-critical pressures (pressures below the critical pressure of the fluid present in the gel at some point) and optionally using surface modifying agents.

In the wet gel stage, the pores of a gel material are typically filled with a solvent(s) originating from the medium in which the gel precursors were polymerized. Generally, preferred solvents are low molecular weight organic compounds such as alcohols, having 1 to 6 carbon atoms, more commonly 1 to 4. Other applicable solvents include, but are not limited to: ethyl acetate, ethyl acetoacetate, acetone, dichloromethane, ethers and the like. However, due to the relatively high vapor pressure of such solvents (at typical ambient temperatures), a significant amount of solvent evaporation occurs, resulting in numerous problems. Examples are: solvent vapor emissions to the environment, exposure of manufacturing personnel to significant concentrations of solvents, fire hazards due to high concentrations of combustible solvent vapors, lower efficiency of the overall process and higher-than-necessary operating costs, among others.

The lowest temperature at which a liquid (i.e. solvent) releases a sufficient vapor concentration to form an ignitable mixture with the air near the surface of the liquid is termed the "flash point". At ambient temperatures most of the aforementioned solvents are above their flash points. For example, the flash points for ethanol and methanol are about 13° C. and about 11° C. respectively at ambient pressures; thus requiring extra safety measures for gels prepared using such media. This issue is magnified in larger production scales where for example large gel sheets are cast in an open environment. For instance, gel sheets thicker than 1 mm having an exposed surface area of several square feet can emit a large concentration of solvents. Such gel sheets are described in U.S. Pat. No. 6,686,123 and published US patent application 2005/0046086 both hereby incorporated by reference. Both references describe large-scale production of gel sheets and fiber reinforced composites forms thereof in continuous or semi-continuous modes of operation.

It is expected that (a) casting thicker gels, (b) casting gels with large exposed surfaces (i.e. large casting area) or (c) both, would involve more solvent evaporation (higher concentration). In one embodiment of the present invention, the cast gels of interest are at least about 0.5 mm, at least about 1 mm or at least 2 mm thick. This is in contrast to gel films which typically exhibit thicknesses in the micron range.

In general, reduction of solvent vapor concentration may be accomplished via: (i) cooling the liquid solvent (i.e. solvent vapor source); (ii) diluting the solvent vapors with other gases (e.g. $N_2$, Argon, etc.); (iii) establishing an air flow (e.g. exhaust fan) which guides the solvent vapors away from the solvent or (iv) a combination thereof. Optionally, the casting apparatus or at least a portion thereof is enclosed to aid in solvent vapor management. Within embodiments of the present invention, the solvent vapor concentration is preferably below that of its flash point.

Low temperature gelation (for sol-gel processes) can be found in U.S. Pat. No. 6,884,822 wherein a sol (colloidal suspension of gel precursors) is cooled to slow the gelation process in order to prepare higher quality gel monoliths. As such, issues pertaining to solvent vapor management, particularly in large-scale and/or continuous schemes are not specifically addressed. Processes for casting cellulose triacetate films are described in published US application US2004/0046272. Said gel films are cast about a rotary drum cooled to aid gel formation. The cooling mechanism is utilized to form the very thin organic gel films. Similarly, production of organic gel sections is described in U.S. Pat. No. 6,187,250 wherein a cooling means is used to control the temperature of the reaction mixture.

Embodiments of the present invention provide for reducing solvent vapor concentration in the vicinity of formed gels. For clarification, gel formation is understood as the point in which the mixture comprising the precursors exhibits resistance to flow and/or where a continuous polymeric network is formed throughout the volume of the mixture. Reaction kinetics pertaining to gel formation can vary significantly depending on factors such as reaction mechanism, concentration/chemical identity of components and reaction conditions, among others. As an example and without any implied limitation, the sol-gel reaction for forming a gel material from silicate precursors is significantly slowed at reduced temperatures. Stated differently, gel time is generally increased at lower temperatures. For certain production schemes, such as those involving continuous gel manufacturing, a slower process may be undesirable since it may necessitate larger casting apparatuses, more catalyst, etc. In one aspect of the present invention, the solvent vapor concentration is reduced after the gel material is formed. Furthermore, in certain embodiments, the present invention allows for solvent vapor management without compromising the quality of the final product or increasing the gellation time.

In one embodiment, the present invention utilizes a gel casting method, for either a continuous or semi-continuous gel production process wherein the formed gel is cooled. At lower temperatures the vapor pressure of solvents within the wet gel (gel sheet) is reduced significantly thereby enabling a more economic process and a safer work environment; the economic benefit is even more pronounced where solvent recycling is desired considering the otherwise difficult steps for solvent vapor recycling. Most notably, at lower temperatures namely that below the solvent flash point, combustion probability is greatly reduced and operator safely is thus enhanced. Accordingly one mode of practice comprises the steps of: forming a gel sheet by dispensing a gel precursor mixture onto a moving element at a predetermined rate effective to allow gelation to occur to the gel precursor mixture on the moving element; and cooling the formed gel thereby reducing the rate of solvent evaporation therefrom.

In one embodiment, solvent vapor concentration is reduced via a cooling element positioned adjacent to the formed gel without physical contact there between. Most preferably, the cooling element is positioned such that it is substantially only adjacent to the formed gel; as opposed to being positioned adjacent to the gel precursor mixture.

In the ensuing embodiments, solvent management methods for gel production are described within the context of continuous or semi-continuous gel production, aided by the accompanying figures and without any implied limitation on the nature or scope of the present invention. In one embodiment, a gel precursor mixture 4 is poured onto a moving element 6, such as a conveyor belt as depicted in the accompanying figures. Said gel precursor mixture may or may not comprise a gel inducing agent (e.g. catalyst, heat, etc.) to promote gel formation. The moving element is designed to receive the gel precursor mixture where a gel sheet 12 is subsequently cast thereon and to convey the same. The moving element 6 can be made from polymeric, metal reinforced polymeric, or metallic materials, preferably stainless steel or aluminum; the belt may be one piece or comprise linked pieces so long as it supports casting and conveyance of gel sheets.

Figure 2:
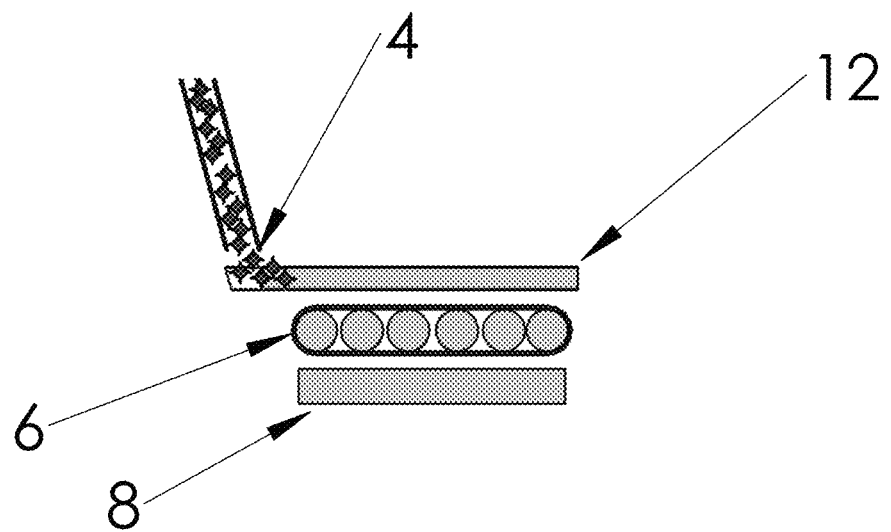
FIG. 2. illustrates an embodiment of the invention where the gel formation occurs relatively early.
Figure 3:
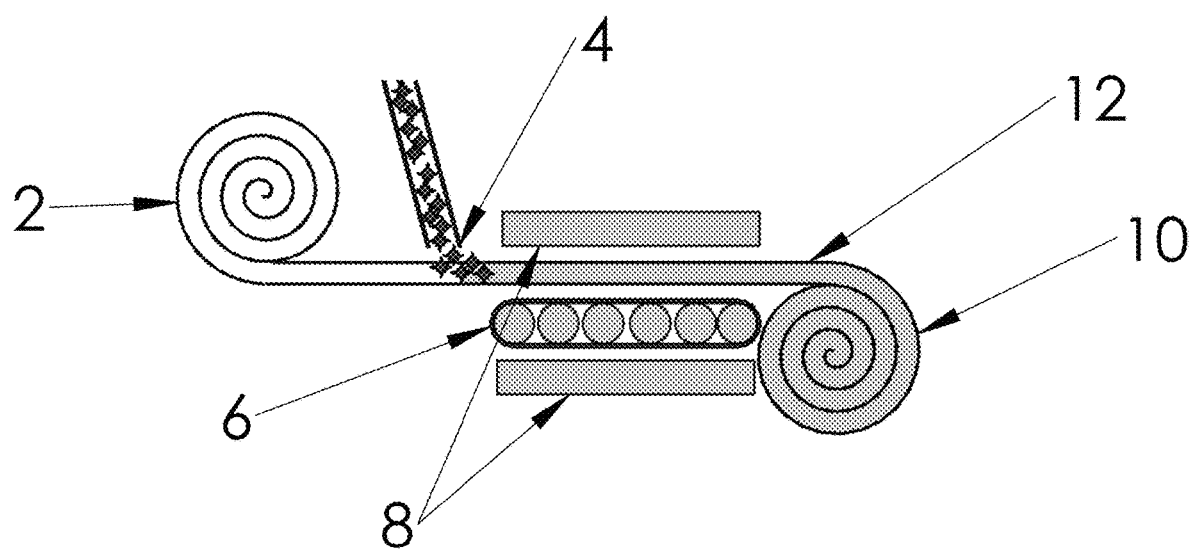
FIG. 3. illustrates an embodiment of the invention where the gel formation occurs relatively early.
Figure 4:
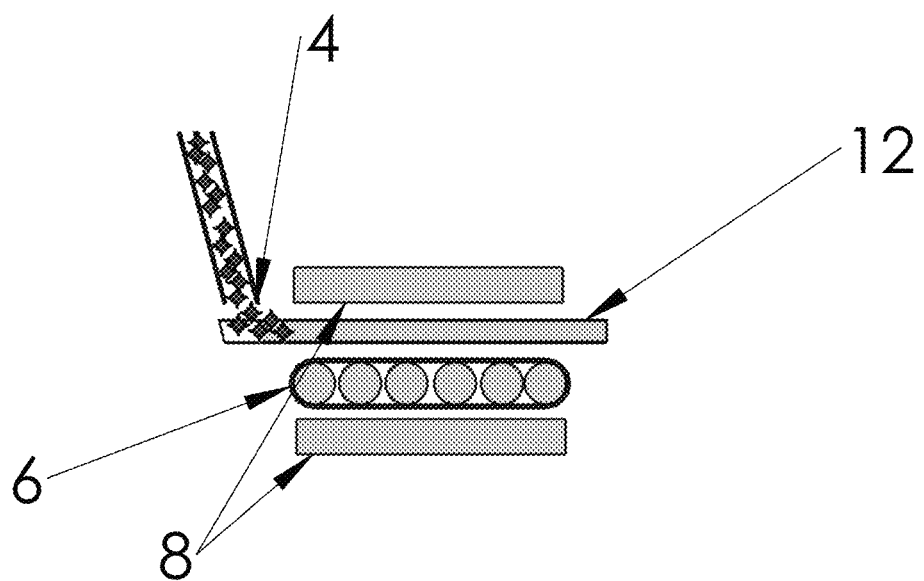
FIG. 4. illustrates an embodiment of the invention where the gel formation occurs relatively early.
Figure 5:
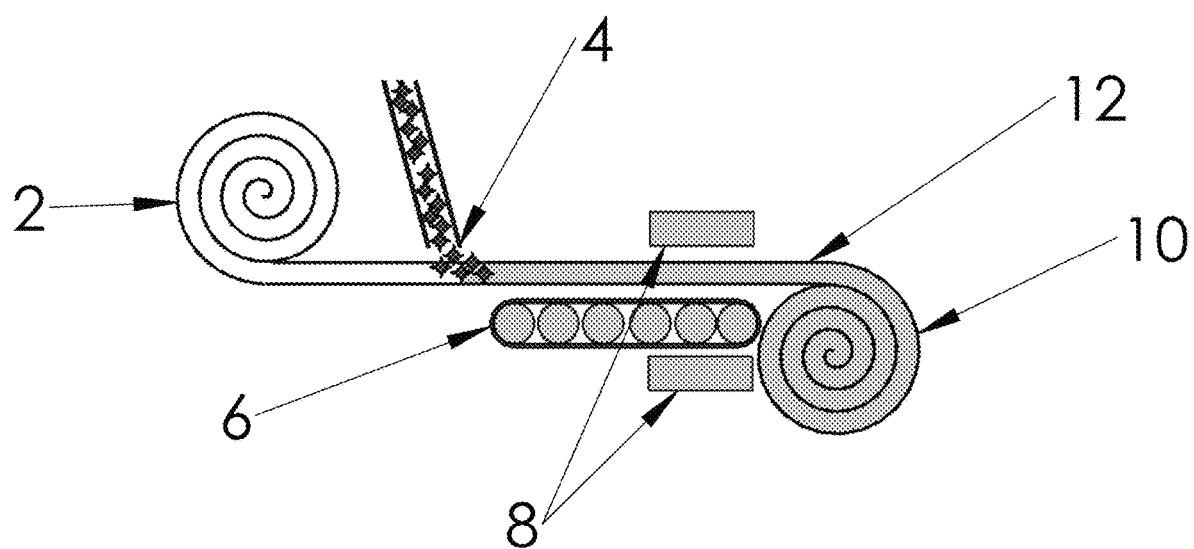
FIG. 5. illustrates an embodiment of the invention where the gel formation occurs relatively later.
Figure 6:
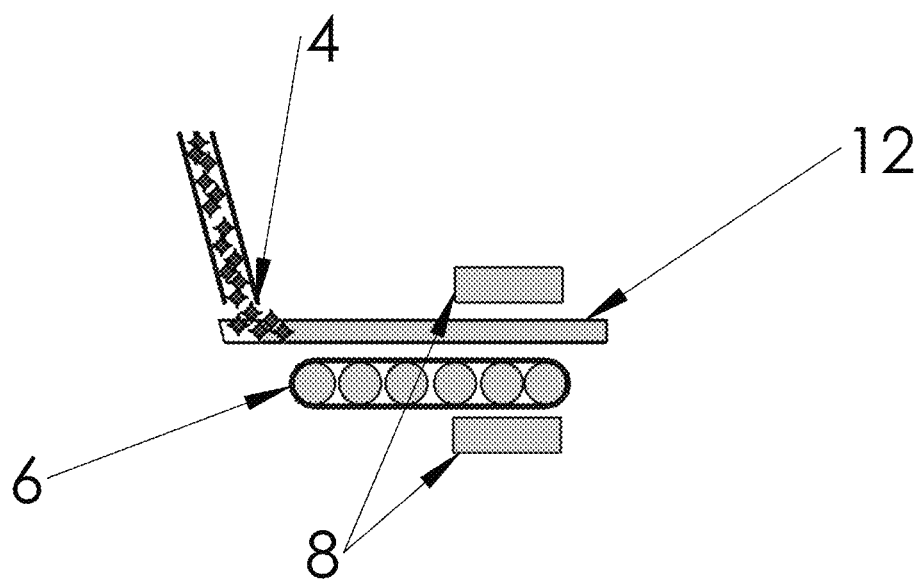
FIG. 6. illustrates an embodiment of the invention where the gel formation occurs relatively later.
Figure 7:
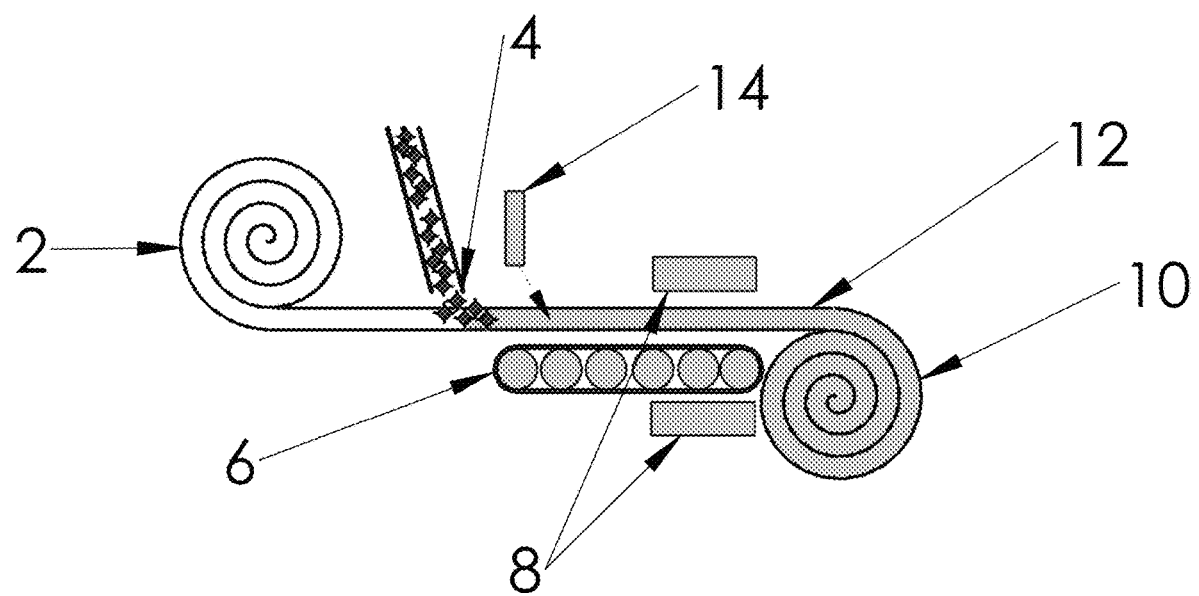
FIG. 7. illustrates an embodiment of the invention where the gel formation occurs relatively later.
Figure 8:
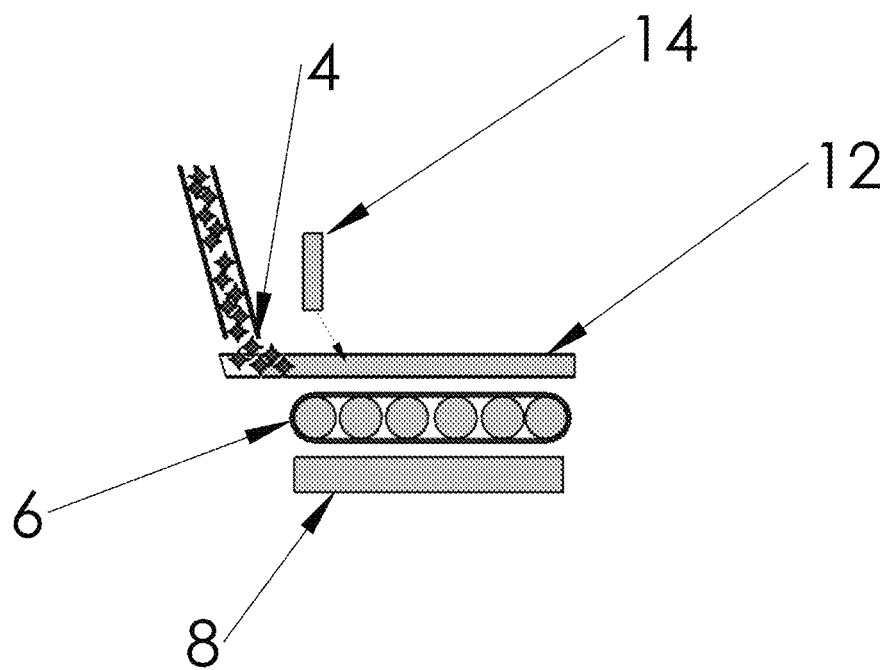
FIG. 8. illustrates an embodiment of the invention where the gel formation occurs relatively later.
Figure 9:
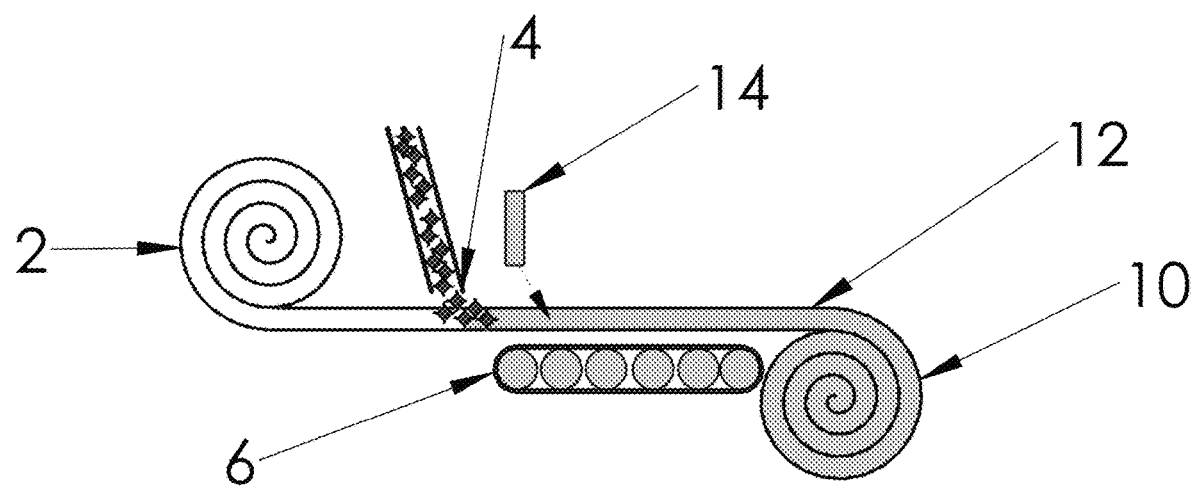
FIG. 9. illustrates an embodiment of the invention where the gel formation occurs relatively later.
Figure 10:
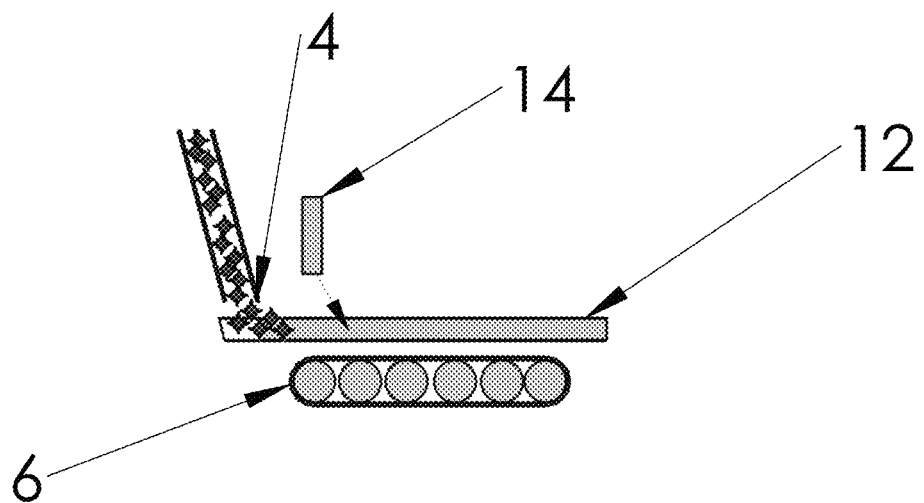
FIG. 10. illustrates an embodiment of the invention.

In order to cool the formed gel, a cooling element(s) 8 may be positioned on one side (FIGS. 1 and 2) or multiple sides of the formed gel; alternatively the cooling element may circumvent the cast gel. Said cooling element is designed to reduce the temperature of the gel sheet by:
(a) cooling the gel sheet directly;
(b) cooling the moving element, and therefore the gel sheet; or
(c) cooling both the moving element and the gel sheet.

Within the context of the present invention, cooling of a gel sheet and references similar thereto imply reduction in temperature of the solvents in the gel. In one embodiment, the gel sheet is cooled to a temperature below room temperature, or below about 20° C., or between about 20° C. and about 0° C. including all individual values within this range.

It is preferred that the cooling element be shaped to accommodate for the moving element while sufficiently close enough to reduce the temperature of the gel sheet. Cooling may be achieved via any heat transfer mechanism such as conduction, convection, radiation or a combination thereof. It is also preferred that the cooling elements target only the region where the gel sheet is formed; in other words, that the cooling of the gel precursor mixture be avoided. FIGS. 1-4 represent situations where gel formation occurs relatively early in the continuous casting process requiring that the cooling elements be positioned relatively close to the region on the moving element where the gel precursor mixture is initially introduced. Conversely, FIGS. 5-9 represent situations where a gel forms relatively later.

As far as design, the cooling element may embody any form as long as it can achieve a temperature(s) in the aforementioned ranges. The cooling element can be a container designed to house a desired volume of coolant fluids; the fluids may flow through said container or remain stationary therein. The cooling element can alternatively be a slab, housing or engaging a set of flow lines carrying coolants. The flow lines can be configured in any manner to cool the slab. One such example is a simple winding pattern. Another form of cooling element delivers a gas stream at reduced temperatures.

FIGS. 1, 3, 5, 7 and 9 illustrate a continuous gel casting scheme wherein the gel precursor mixture is continuously (or semi-continuously) combined with a fibrous structure 2 and upon gellation yields a fiber-reinforced gel sheet 12 (FIGS. 1,3,5,7 and 9.) Exemplary fibrous structures include, but are not limited to: wovens, non-wovens, mats, felts, battings (lofty battings) and combinations thereof. The conveyed gel (including fiber-reinforced gel) 12 may also be rolled in to a rolled gel sheet 10.

In yet another embodiment, at least one gas source 14 is positioned adjacent to the moving element and directs a flow of inert gas such as such as $N_2$ to dilute the solvent vapor above the gel sheet and the gel precursor mixture. This mechanism is also depicted in FIGS. 7-10. It is however more preferred that the gas source only reduce the solvent vapor concentration directly above the formed gel in order to avoid potential interferences with the polymerization kinetics occurring in the gel precursor mixture.

Figure 11:
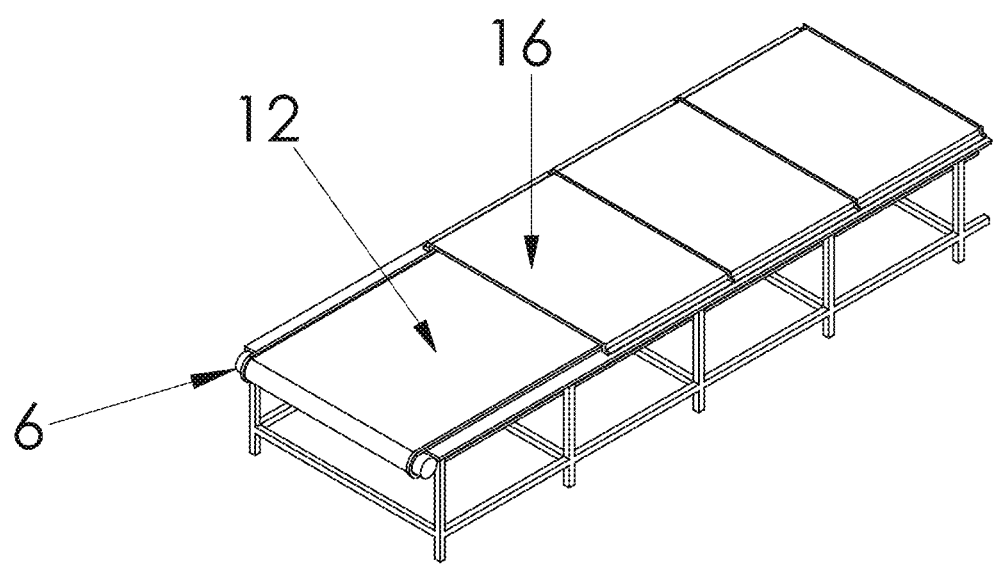
FIG. 11. illustrates an embodiment of the invention.

In another embodiment, at least a portion of the casting area (e.g. moving element) is covered by an enclosure 16, as also exemplified in FIG. 11. The enclosure could be constructed from metallic or polymeric materials. Said enclosure may be further combined with any of the aforementioned cooling means and/or gas source to facilitate solvent vapor management, and further improve safety. The internal volume of this enclosure can be maintained at low enough temperatures to be below the flash point of the solvents. If desired, the enclosure may be large enough to permit mobility and normal operating activity of at least one human technician therein.

The claimed invention is:

1. A method for manufacture of a gel material comprising:
   (a) forming a gel sheet with thickness of at least about 0.5 mm by dispensing a gel precursor mixture at first temperature, and allowing gelation of a gel precursor of the gel precursor mixture to occur; and
   (b) cooling at least one surface of the gel sheet at a second temperature with at least one cooling system, wherein the second temperature is cooler than the first temperature, wherein the cooling reduces a rate of a solvent evaporation.

2. The method of claim 1, wherein the gel precursor comprises a metal oxide gel precursor.

3. The method of claim 1, wherein the gelation of the gel precursor occurs at a temperature between the first temperature and the second temperature.

4. The method of claim 1, wherein one or more of the at least one cooling system is not in physical contact with the gel sheet.

5. The method of claim 1, wherein one or more of the at least one cooling system is in physical contact with the gel sheet.

6. The method of claim 1, wherein at least one surface of the gel sheet is cooled at a third temperature which is cooler than the first temperature.

7. The method of claim 6, wherein at least one surface of the gel sheet is cooled at the second temperature by a first cooling system which is not in physical contact with the gel sheet; and at least one surface of the gel sheet is cooled at the third temperature by a second cooling system which is in physical contact with the gel sheet.

8. The method of claim 1, wherein the second temperature is below about 20° C.

9. The method of claim 6, wherein the second temperature is below about 20° C., and the third temperature is below about 20° C.

10. The method of claim 1, wherein the gel precursor mixture comprises a gel precursor and a solvent, and wherein the gel precursor mixture is dispensed onto a moving element.

11. The method of claim 10, wherein the cooling occurs on the moving element.

12. The method of claim 1, wherein the cooling controls reaction rate.

13. The method of claim 12, wherein the reaction rate includes gel time.

14. A method for manufacture of a fiber-reinforced gel material comprising:
   (a) forming a fiber-reinforced gel sheet with thickness of at least about 0.5 mm by combining a fibrous structure and a gel precursor mixture at a first temperature, and allowing gelation of a gel precursor of the gel precursor mixture to occur; and
   (b) cooling at least one surface of the fiber-reinforced gel sheet at a second temperature with at least one cooling system, wherein the second temperature is cooler than the first temperature, and wherein the cooling reduces a rate of a solvent evaporation.

15. The method of claim 14, wherein the gel precursor comprises a metal oxide gel precursor.

16. The method of claim 15, wherein the fibrous structure comprises a fibrous batting.

17. The method of claim 14, wherein one or more of the at least one cooling system is not in physical contact with the fiber-reinforced gel sheet.

18. The method of claim 14, wherein one or more of the at least one cooling system is in physical contact with the fiber-reinforced gel sheet.

19. The method of claim 14, wherein at least one surface of the fiber-reinforced gel sheet is cooled at a third temperature which is cooler than the first temperature.

20. The method of claim 19, wherein at least one surface of the fiber-reinforced gel sheet is cooled at the second temperature by a first cooling system which is not in physical contact with the fiber-reinforced gel sheet; and at least one surface of the fiber-reinforced gel sheet is cooled at the third temperature by a second cooling system which is in physical contact with the fiber-reinforced gel sheet.

21. The method of claim 14, wherein the second temperature is below about 20° C.

22. The method of claim 19, wherein the second temperature is below about 20° C., and the third temperature is below about 20° C.

23. The method of claim 14, wherein the gel precursor mixture comprises the gel precursor and a solvent, and wherein the gel precursor mixture is dispensed onto a moving element.

24. The method of claim 23, wherein the cooling occurs on the moving element.

25. The method of claim 14, wherein the cooling controls reaction rate.

26. The method of claim 25, wherein the reaction rate includes gel time.

\* \* \* \* \*